US006463547B1

United States Patent
Bailey et al.

(10) Patent No.: US 6,463,547 B1
(45) Date of Patent: Oct. 8, 2002

(54) DUAL ON-CHIP AND IN-PACKAGE CLOCK DISTRIBUTION SYSTEM

(75) Inventors: Daniel W. Bailey, Northboro, MA (US); Jeffrey D. Pickholtz, Marlboro, MA (US); Shane L. Bell, Shrewsbury, MA (US); Richard B. Watson, Jr., Harvard, MA (US); William J. Bowhill, Framingham, MA (US)

(73) Assignee: Compaq Information Technologies Group LP, Houston, TX (US)

( * ) Notice: Subject to any disclaimer, the term of this patent is extended or adjusted under 35 U.S.C. 154(b) by 0 days.

(21) Appl. No.: 09/457,604

(22) Filed: Dec. 8, 1999

(51) Int. Cl.[7] .............................................. G06F 1/04
(52) U.S. Cl. ...................................... 713/500; 713/503
(58) Field of Search ................................ 713/400, 401, 713/500, 501, 503, 600; 716/4, 6, 10, 13; 714/25, 30, 37, 731

(56) References Cited

U.S. PATENT DOCUMENTS

| 4,441,075 A | * | 4/1984 | McMahon .................. 714/731 |
| 4,503,386 A | * | 3/1985 | DasGupta et al. .......... 714/731 |
| 5,790,841 A | * | 8/1998 | Scherer et al. .............. 713/503 |
| 6,161,215 A | * | 12/2000 | Hollenbeck et al. .......... 716/15 |

OTHER PUBLICATIONS

Cao, L., et al., "A Novel 'Double–Decker' Flip–Chip/BGA Package for Low Power Giga–Hertz Clock Distribution", *Electronic Components and Technology Conference*, pp. 1152–1157 (1997).

Zhu, Q., et al., "Planar Clock Routing for High Performance Chip and Package Co–Design", *IEEE Transactions on Very Large Scale Integration (VLSI) Systems*, vol. 4, No. 2, pp. 210–225 (Jun. 1996).

Zhu, Q., et al., "Package Clock Distribution Design Optimization for High–Speed and Low–Power VLSI's", *IEEE Transactions on Components, Packaging, and Manufacturing Technology*—Part B, vol. 20, No. 1, pp. 56–63 (Feb. 1997).

Zhu, Q., et al., "Chip and Package Co–Design Technique for Clock Networks", *Multi–Chip Module Conference*, pp. 160–163 (1996).

* cited by examiner

Primary Examiner—Dennis M. Butler
(74) Attorney, Agent, or Firm—Hamilton, Brook, Smith & Reynolds, P.C.

(57) ABSTRACT

A clock distribution system for a semiconductor device provides for both on-chip and in-package clock distribution via on-chip and in-package clock distribution networks. Each of these networks is selectively enabled depending on the mode of operation. Specifically, for wafer testing, the on-chip clock distribution network is selected. Thus, a probe tester need only provide a single clock source with conventional timing specifications to test the operation of the chip. In contrast, during normal operation, an in-package clock distribution network is enabled. In-package clock routing provides the lowest variation mode and thus, will result in the maximum clock frequency for the chip.

19 Claims, 4 Drawing Sheets

DUAL ON-CHIP AND IN-PACKAGE CLOCK DISTRIBUTION SYSTEM

BACKGROUND OF THE INVENTION

Accurate clock distribution, especially in microprocessors, is typically the criticality at high clock speeds. The operation of logic on physically remote sections of the chip must be coordinated to ensure collective proper operation. Even with careful design, however, problems still arise due to on-chip process, temperature, power supply, and other variations.

Active skew management of clock domains, commonly included in the form of Delay Locked Loops (DLL) or Phase Locked Loops (PLL), can reduce some of the variation problems within the separate clock domains. The clock domains may be widely dispersed across the die but must receive a synchronous clock signal, or timing reference, the origin of which may be remote from the clock domain. For a processor with clock domains, the receivers may be the phase detector of a DLL or PLL, or it may be an inverter that designates the start of the local clock distribution network.

If the clock timing reference is distributed on the die, signal attenuation requires repeater (i.e. inverter) insertion at regularly spaced intervals between the source and receivers. Modem microprocessors are too large to send a signal across the die without several repeaters. The problem with this approach is that widely dispersed repeaters will be subject to process, voltage, and temperature variations, and the interconnect may inductively or capacitively couple to the signals causing signal delay variation. These variations can cause race-through failure if not corrected. Race-through failure is a functional failure caused by a signal propagating through two latches (instead of one) on a single clock edge. Even if race-though failure is prevented by deskewing techniques, clock edge variation will inevitably cause chip performance degradation.

Alternatively, the timing reference may be sent through the package. The generally preferred approach to in-package distribution is to drive the clock off the chip through a package layers to re-enter the chip through bumps near each receiver. The advantage of this approach is that the package interconnect is typically several orders of magnitude less lossy than on-chip interconnect. That is, in-package interconnect can be more than 100 times less resistive. This allows the clock timing reference to be distributed without repeaters.

SUMMARY OF THE INVENTION

The primary disadvantage of in-package clock distribution is that wafer probe testing is very difficult and potentially costly. Wafer probe testing is a set of low-frequency tests to determine which chips are to be discarded prior to packaging. The tester must be able to emulate the package layer dedicated to the clock distribution, or else provide a carefully synchronized clock signal to all clock-domain receivers. If the clock is not synchronized to all receivers, functional race-through failure is likely (if no other precautions are taken). Such testing failures prevent accurate assessment of the chip.

Chip size increases have been a consistent trend for many years in microprocessor design. This trend, thus, renders on-chip clock distribution even more problematic. This, coupled with process shrinks, has made clock distribution an increasingly difficult problem for each design phase.

The present invention is directed to a clock distribution system for a semiconductor device which provides for both on-chip and in-package clock distribution via on-chip and in-package clock distribution networks. Each of these networks is selectively enabled depending on the mode of operation. Specifically, for wafer testing, the on-chip clock distribution network is selected. Thus, a probe tester need only provide a single clock source with conventional timing specifications to test the operation of the chip. In contrast, during normal operation, an in-package clock distribution network is enabled. In-package clock routing provides the lowest variation mode and thus, will result in the maximum clock frequency for the chip.

In general, according to one aspect, the invention features a clock distribution system for a packaged semiconductor device. The system comprises an on-chip clock distribution network that transmits a clock signal between a clock source and clocked logic. An in-package clock distribution network also transmits the clock signal between the source and logic. A mode selector is provided that supplies the clock signal, from either the on-chip clock distribution network or the in-package clock distribution network, to the clocked logic.

In specific embodiments, the mode selector disables the on-chip distribution network during normal operation of the packaged semiconductor device. Normal operation typically occurs when the device is installed on a printed circuit board, such as a motherboard of a computer system. The mode selector, however, provides only the clock signal received via the on-chip distribution network when the semiconductor device is being tested by a probe tester, for example. Typically, this testing occurs prior to installation of the chip in the package.

Preferably, the mode selector comprises a clock source demultiplexer. This demultiplexer is located near the clock source for the chip. It provides the clock signal on either the on-chip clock distribution network or the in-package clock distribution network. Logic multiplexers are also provided, which are located near the clock logic on the chip. It provides the clock signal from either the on-chip clock distribution network or the in-package clock distribution network to the clocked logic.

In general, according to another aspect, the invention also features a clock distribution method for a packaged semiconductor device. This method comprises distributing a clock signal via an on-chip clock distribution network from a clock source to clocked logic during testing and providing for this clock distribution. During normal operation, however, when the chip is packaged, the clock signal is distributed by an in-package clock distribution network from the clock source to the clocked logic.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
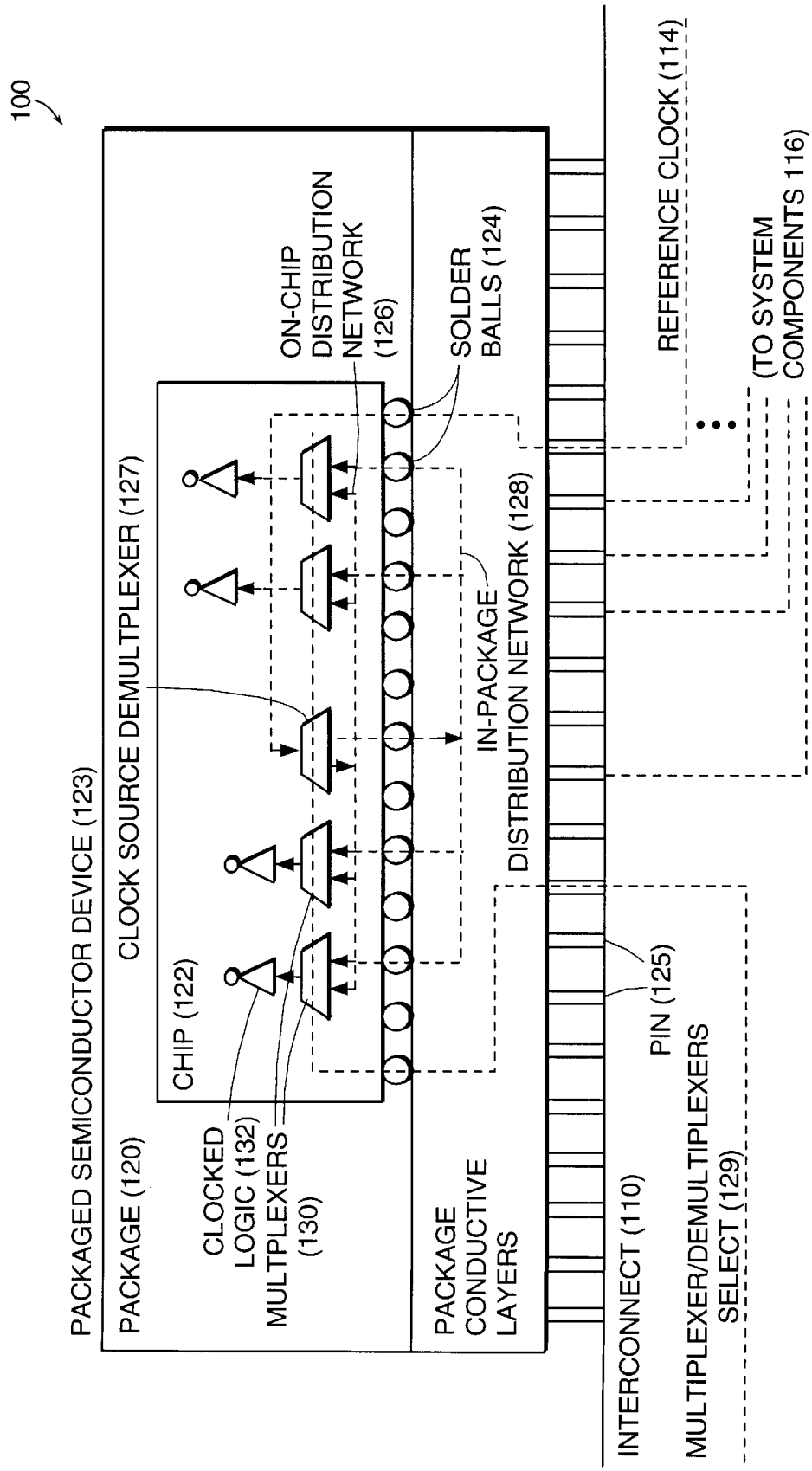
FIG. 1 is a schematic side, cross-sectional view of a computer system showing a semiconductor device having a clock distribution system according to the present invention.

FIG. 1 is a schematic diagram of a computer system 100, including a packaged semiconductor device 123, which has a clock distribution system that is configured according to the principles of the present invention.

The computer system 100 comprises a semiconductor device interconnect 110. Typically, this is a printed circuit board, such as a motherboard for the computer system, although it can also be a processor card, which connects to the main board. The interconnect 110 supports communications between the semiconductor device 123 and other system components 116 of the computer system 100.

The semiconductor device 123 comprises a chip package 120 and a chip 122. The chip 122 is constructed from semiconductor material and contains the logic functionality of the semiconductor device 123. The package 120 protects the chip from the surrounding environment, facilitates heat dissipation, and also provides the electrical connections between the chip 122 and the interconnect 110. Such connections are typically provided by wirebonds, or solder balls 124 between the chip 122 and the package 120, and by pins 125 between the package 120 and the interconnect 110.

In the typical implementation, the reference clock 114 for the packaged semiconductor device 123, which is typically a microprocessor, is located externally and provides the clock signal to the semiconductor device via the interconnect 110 and the pins 125 and the solder balls 124 of the package 120.

According to the invention, the clock signal is transmitted to a clock source demultiplexer 127. This clock source demultiplexer 127 is located on the chip 122, preferably close to where the clock signal is received onto the chip 122.

The clock source demultiplexer 127 is controlled either by logic on the chip 122 or via external control 129 to transmit the clock signal either on an on-chip clock distribution network 126 or an in-package clock distribution network 128.

The clock signal is transmitted via one of the networks 126, 128 to logic multiplexers 130. These logic multiplexers 130 are located near clocked logic 132, which is controlled by the clock signal. Such clocked logic typically provides the logic functionality provided by the semiconductor device such as cache operation, arithmetic logic unit or multiplier functionality, register storage, etc. The logic multiplexers 130 are similarly controlled by either on or off chip mode control 129 to provide a clock signal from either the on-chip clock distribution network 126 or the in-package clock distribution network 128 to the clocked logic 132. This mode control signal can be generated by an off-chip signal or by an on-chip state machine, or by a combination of an off-chip signal and on-chip state machine. In the illustrated embodiment where the packaged semiconductor device 123 is operating in normal operation and installed in a computer system, the clock source demultiplexer 127 uses the in-package clock distribution network to transfer the clock signal.

Figure 2:
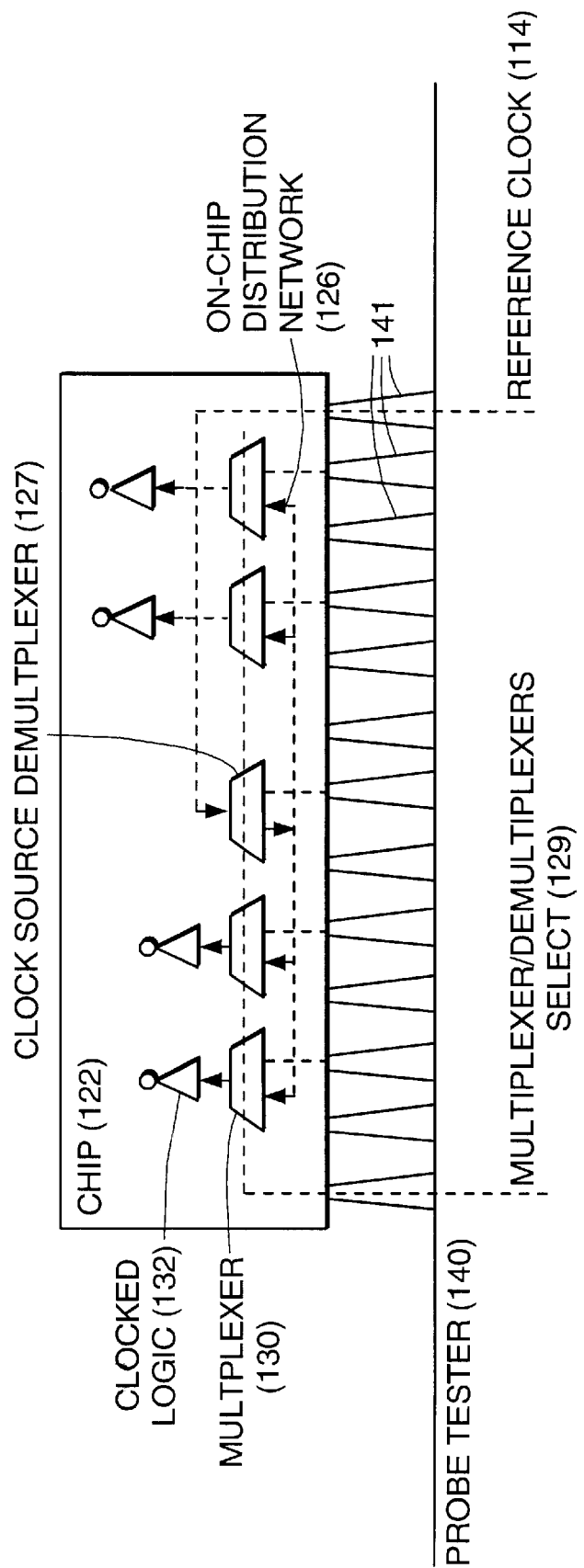
FIG. 2 is a schematic side, cross-sectional view showing the testing of a chip having a clock distribution system according to the present invention.

FIG. 2 shows the operation of the invention when the chip 122 is being tested, typically prior to installation in a package and thus prior to operation in its normal mode of use. In this case, the chip 122 is being tested by a probe tester 140. Since the chip is typically not yet installed in a package, the in-package clock distribution network (128) is not operational and/or not present. In this state, however, with the present invention, the probe tester 140 can be used to supply the clock signal to the clock source demultiplexer 127 via probes 141. This clock source demultiplexer 127 then supplies the clock signal via the on-chip clock distribution network 126 to the logic multiplexers 130. These logic multiplexors are controlled such that they use the clock signal appearing on the on-chip clock distribution network as the clock signal, which is supplied to the clocked logic 132. As a result, the logic operation of the clock logic 132 can be confirmed by the analysis section of the probe tester 140. This can be used to verify proper operation before the expense of installing the chip 122 in a package 120 is incurred.

Figure 3:
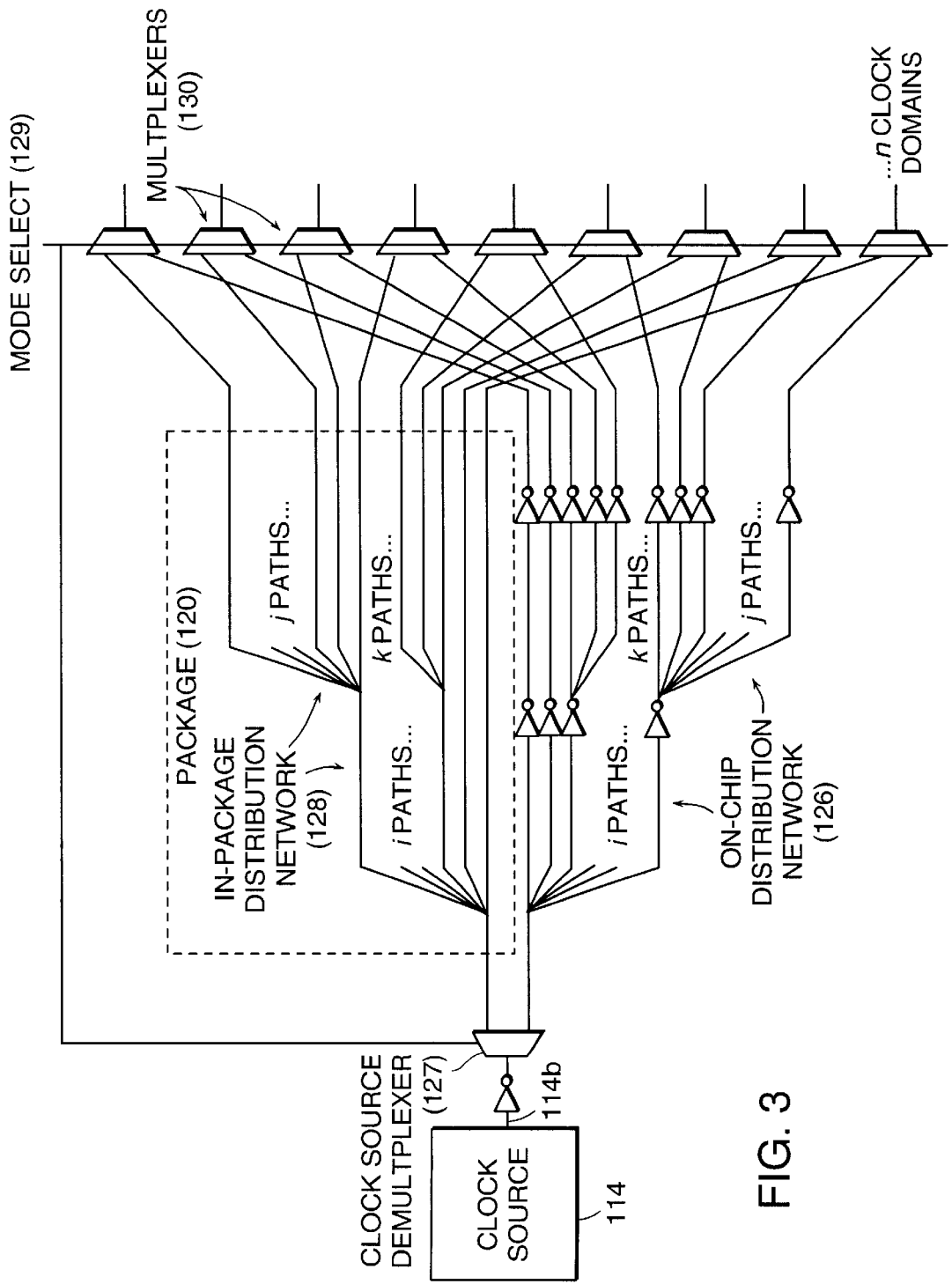
FIG. 3 is a floor plan showing a clock distribution system providing for both on-chip and in-package distribution according to the present invention.

FIG. 3 is a tree diagram showing the dual on-chip and in-package clock distribution networks 126, 128. A clock source, which can either be an actual oscillator (114) or simply the place where the off chip-generated clock (114b) comes onto the chip. As shown, there are an arbitrary number of separate paths and branches for each one of the distribution networks 126, 128. As shown, however, the final number of paths between the two networks match since a clock signal for both networks must be sent to the clocked logic in each of separate clock domains 1-n. The preferred implementation is shown where the branches and paths between the in-package network 128 and the on-chip distribution network 126 correspond in a one-to-one arrangement.

Figure 4:
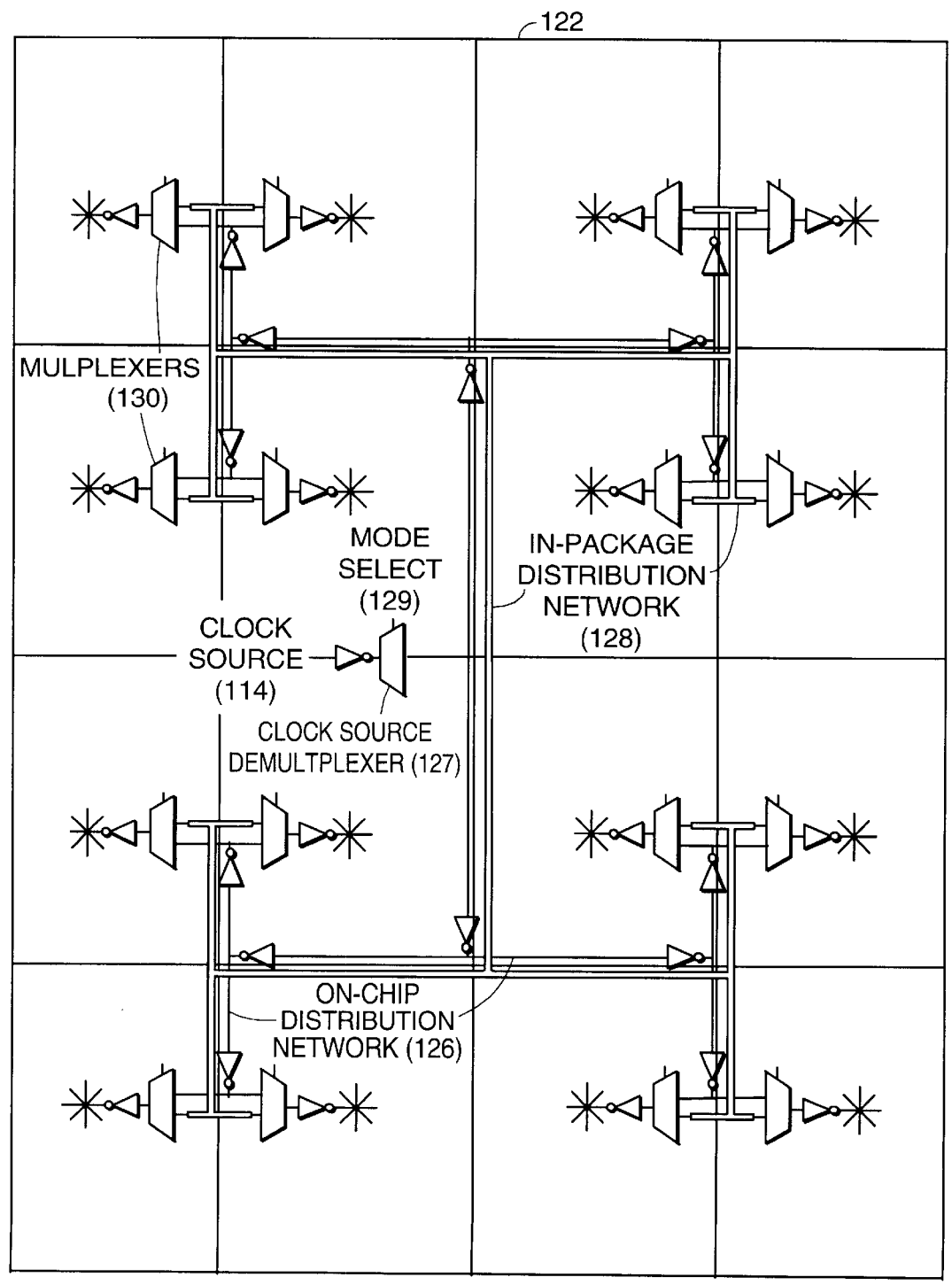
FIG. 4 is a tree diagram showing the clock distribution system according to the present invention.

FIG. 4 shows an example floor plan schematic of an embodiment of the dual on-chip and in-package clock distribution system. The clock domains of the chip 122 are delineated by lines and do not necessarily have equal areas. Each on-chip path for the clock source to each clock domain receiver/multiplexer 130 is delay matched. Each in-package path for the clock source in each clock domain receiver is delay matched, but not to its corresponding on-chip path. As such, paths do not have to shadow one another, even though that is the way they are shown.

Of note, is the fact that precautions must still be taken so that chip circuits are not subject to race-through failure because the on-chip clock distribution network is subject to skew and jitter. This can be done using conventional deskewing methods for signals sent between different clock domains. The maximum clock frequency will be lower when using the on-chip clock distribution network 126, but this is typically not a problem because wafer probe testing typically occurs at very low frequency.

The clock source can be provided by a Phase-Locked Loop (PLL), Delay-Locked Loop (DLL), or off-chip clock. The package preferably uses bumps and the in-package clock signal is sent out through one or more bumps near the center of the die to minimize the maximum distance to any clock domain. After being multiplexed in the clock domain, the synchronized clock signal is typically received by a DLL, although a PLL would work also. The DLL or PLL can be used to synchronize each domain clock to the distributed clock signal which effectively synchronizes the entire chip. Neither a DLL nor PLL is absolutely necessary.

While this invention has been particularly shown and described with references to preferred embodiments thereof, it will be understood by those skilled in the art that various changes in form and details may be made therein without departing from the scope of the invention encompassed by the appended claims.

What is claimed is:

1. A clock distribution system for a packaged semiconductor device, comprising:
   an on-chip clock distribution network for transmitting a clock signal between a clock source and clocked logic;
   an in-package clock distribution network for transmitting the clock signal between the clock source and the clocked logic; and
   a mode selector for providing the clock signal supplied by either the on-chip clock distribution network or the in-package clock distribution network to the clocked logic.

2. A clock distribution system as claimed in claim 1, wherein the mode selector disables the on-chip distribution network during normal operation of the packaged semiconductor device.

3. A clock distribution system as claimed in claim 1, wherein the mode selector provides only the clock signal received via the in-package clock distribution network to the clocked logic during normal operation of the packaged semiconductor device.

4. A clock distribution system as claimed in claim 1, wherein the mode selector provides only the clock signal received via the on-chip distribution network when the semiconductor device is being tested prior to installation in a package.

5. A clock distribution system as claimed in claim 1, wherein the mode selector provides only the clock signal received via the on-chip distribution network when the semiconductor device is being tested during manufacture.

6. A clock distribution system as claimed in claim 1, wherein the mode selector provides only the clock signal to the clocked logic which has been received via the on-chip distribution network when the semiconductor device is being tested prior to installation in a package and wherein the mode selector provides only the clock signal received via the on-chip distribution network to the clocked logic when the semiconductor device is being tested.

7. A clock distribution system as claimed in claim 1, wherein the mode selector comprises a clock source demultiplexer, which is located near the clock source for the chip, for providing the clock signal on either the on-chip clock distribution network or the in-package clock distribution network.

8. A clock distribution system as claimed in claim 1, wherein the mode selector comprises at least one logic multiplexer, which is located near the clocked logic on the chip, for providing the clock signal from either the on-chip clock distribution network or the in-package clock distribution network to control the clocked logic.

9. A clock distribution system as claimed in claim 1, wherein the mode selector provides only the clock signal received via the on-chip distribution network when the semiconductor device is being tested during manufacture.

10. A clock distribution system as claimed in claim 1, wherein the mode selector comprises:
    a clock source demultiplexer, which is located near the clock source for the chip, for providing the clock signal on either the on-chip clock distribution network or the in-package clock distribution network; and
    a logic multiplexer, which is located near the clocked logic on the chip, for providing the clock signal from either the on-chip clock distribution network or the in-package clock distribution network to control the clocked logic.

11. A clock distribution system as claimed in claim 1, wherein the mode selector disables the in-package distribution network during testing of the packaged semiconductor device.

12. A clock distribution method for a packaged semiconductor device, the method comprising:
    providing for the distribution of a clock signal via an on-chip clock distribution network from a clock source to clocked logic during testing; and
    distributing a clock signal via an in-package clock distribution network from a clock source to clocked logic during normal operation.

13. A clock distribution method as claimed in claim 12, further comprising providing a mode selector on the chip for selecting whether the clock signal is supplied by either the on-chip clock distribution network or the in-package clock distribution network to the clocked logic.

14. A clock distribution method as claimed in claim 13, further comprising the mode selector providing only the clock signal received via the in-package clock distribution network during normal operation of the packaged semiconductor device when installed on a printed circuit board to the clocked logic.

15. A clock distribution method as claimed in claim 13, wherein the mode selector provides only the clock signal received via the on-chip distribution network when the semiconductor device is being tested prior to installation in a package.

16. A clock distribution method as claimed in claim 12, wherein the step of distributing a clock signal via the in-package clock distribution network from a clock source to clocked logic during normal operation comprises distributing the clock signal only via the in-package clock distribution network.

17. A clock distribution method as claimed in claim 12, wherein the step of distributing a clock signal via the on-chip clock distribution network from a clock source to the clocked logic during testing comprises distributing the clock signal, which has been provided via a probe tester, to the clocked logic via the on-chip clock distribution network.

18. A clock distribution system for a packaged semiconductor device, comprising:
    means for transmitting a clock signal between a clock source and clocked logic on a chip via a chip conducting path present in the chip;
    means for transmitting the clock signal between the clock source and the clocked logic via a package conducting path; and
    means for providing the clock signal from the chip conducting path or the package conducting path to the clocked logic.

19. A computer system, comprising:
    a packaged semiconductor device, including a clock distribution system comprising:
        an on-chip clock distribution network for transmitting a clock signal between a clock source and clocked logic,
        an in-package clock distribution network for transmitting the clock signal between the clock source and the clocked logic, and
        a mode selector for providing the clock signal supplied by either the on-chip clock distribution network or the in-package clock distribution network to the clocked logic; and
    a printed circuit board for supporting communications between the semiconductor device and other components of the computer system.

* * * * *